United States Patent
Hatlo et al.

(10) Patent No.: US 10,056,169 B2
(45) Date of Patent: Aug. 21, 2018

(54) SUBMARINE LOW LOSS CABLE SYSTEM AND METHOD FOR ARRANGING A SUBMARINE CABLE LANDFALL SYSTEM

(71) Applicant: NEXANS, Courbevoie (FR)

(72) Inventors: Marius Hatlo, Fredrikstad (NO); Espen Olsen, Halden (NO)

(73) Assignee: Nexans, Carquefou (FR)

( * ) Notice: Subject to any disclaimer, the term of this patent is extended or adjusted under 35 U.S.C. 154(b) by 0 days.

(21) Appl. No.: 15/832,264

(22) Filed: Dec. 5, 2017

(65) Prior Publication Data

US 2018/0158566 A1    Jun. 7, 2018

(30) Foreign Application Priority Data

Dec. 7, 2016    (EP) ..................................... 16306632

(51) Int. Cl.
*H01B 7/00*    (2006.01)
*H01B 7/14*    (2006.01)
(Continued)

(52) U.S. Cl.
CPC ........... *H01B 7/009* (2013.01); *H01B 7/0225* (2013.01); *H01B 7/14* (2013.01); *H02G 1/06* (2013.01); *H02G 9/02* (2013.01)

(58) Field of Classification Search
USPC .......................................... 174/113 R, 106 R
See application file for complete search history.

(56) References Cited

U.S. PATENT DOCUMENTS

| | | | | |
|---|---|---|---|---|
| 1,814,384 A | * | 7/1931 | Hanff ....................... | H01B 7/14 |
| | | | | 174/106 R |
| 1,861,182 A | * | 5/1932 | Hendey .................... | H01B 9/02 |
| | | | | 174/102 SC |

(Continued)

FOREIGN PATENT DOCUMENTS

| JP | 3675913 | 7/2005 |
|---|---|---|
| WO | 2016082860 | 6/2016 |

OTHER PUBLICATIONS

International Search Report dated May 15, 2017.

*Primary Examiner* — William H Mayo, III
*Assistant Examiner* — Krystal Robinson
(74) *Attorney, Agent, or Firm* — Sofer & Haroun, LLP

(57) ABSTRACT

A low loss cable system adapted for use as a cable landfall system. The cable system comprises a cable having a plurality of cores. Each core comprises a conductor, a first insulating layer, a second electrically conductive layer and a third layer. The cable comprises two sections, connected at a connection point CP. A first section of the cable is arranged to be exposed to a landfall area and a second section of the cable is arranged to be exposed to a submarine area. The cable is arranged such that circulating currents are prevented or reduced in the second conductive layers of the cable in the section exposed to the landfall area, thus assisting in maintaining the ampacity of the cable in this section without, or by reducing, the need to increase the cross sectional area of the cable in the landfall area. This is accomplished by electrically connecting the second conductive layers of the cores to each other at the connection point. At a distal end of the first section of the cable, the second layers are arranged to leave an open ended termination, thus avoiding (Continued)

a closed circuit that would otherwise create circulating currents in the second layers of the first section, thus maintaining ampacity.

20 Claims, 4 Drawing Sheets

(51) Int. Cl.
*H02G 1/06* (2006.01)
*H02G 9/02* (2006.01)
*H01B 7/02* (2006.01)

(56) References Cited

U.S. PATENT DOCUMENTS

| | | | | |
|---|---|---|---|---|
| 2,234,068 A * | 3/1941 | Wiseman | H01B 7/28 | 152/DIG. 2 |
| 3,141,060 A * | 7/1964 | Norton | H02G 15/10 | 174/19 |
| 3,592,958 A * | 7/1971 | Munn | H02G 15/14 | 156/49 |
| 3,801,729 A * | 4/1974 | Portinari | H01B 7/009 | 174/106 R |
| 3,874,960 A * | 4/1975 | Matsuzaki | H01R 9/0503 | 156/49 |
| 4,621,167 A * | 11/1986 | Oldham | G02B 6/4427 | 174/70 S |
| 5,080,530 A * | 1/1992 | Crawford | B63B 35/04 | 114/77 R |
| 7,293,895 B2 * | 11/2007 | Grossman | F21S 2/00 | 174/110 R |
| 8,923,940 B2 * | 12/2014 | Stemmle | H01B 12/02 | 505/163 |
| 2001/0016103 A1 * | 8/2001 | Hoch | H01B 7/14 | 385/107 |
| 2005/0232634 A1 * | 10/2005 | Evangelides, Jr. | H02G 9/00 | 398/105 |
| 2007/0237469 A1 * | 10/2007 | Espen | H01B 7/14 | 385/100 |
| 2011/0061892 A1 * | 3/2011 | Ye | H01B 7/328 | 174/113 R |
| 2012/0024565 A1 | 2/2012 | Orini | | |
| 2014/0060884 A1 * | 3/2014 | Patel | H01B 7/2825 | 174/102 A |
| 2014/0166335 A1 * | 6/2014 | Kagoura | H01B 7/045 | 174/107 |

* cited by examiner

SUBMARINE LOW LOSS CABLE SYSTEM AND METHOD FOR ARRANGING A SUBMARINE CABLE LANDFALL SYSTEM

TECHNICAL FIELD

The present invention relates to cable systems, in particular the invention relates to an arrangement for maintaining ampacity in a section of a high voltage alternating current submarine cable traversing a landfall region.

BACKGROUND ART

High voltage alternating current (HVAC) cable systems comprise a conductor located at the centre of the cable, for delivering an electric current. The conductor is usually surrounded by plurality of layers arranged radially outside of the conductor, where each layer has a specific function. A first layer arranged over the conductor may comprise cross-linked polyethylene (XLPE), providing electrical insulation.

Arranged radially outside of the XLPE layer there may be provided a metallic sheath, for electrically shielding and protecting the conductor from abrasion, corrosion and moisture. The current flowing through the conductor induces a voltage in the metallic sheath surrounding the conductor, and if the sheath forms a closed circuit, a circulating current will be generated in the metallic sheath. This circulating current results in power loss and generation of heat in the metallic sheath, causing the temperature of the cable system to increase.

An increase of temperature can lead the cable insulation to deteriorate. Therefore, the amount of current a cable can carry before deteriorating is restricted by a temperature rating. Commonly, the maximum allowable temperature of a HVAC conductor is 90° Celsius for XLPE insulation. The term ampacity is used to describe the conductor's capacity to carry current whilst staying within its temperature rating.

The ampacity of the cable will be dependent on a number of different factors such as the ambient temperature, the electrical current in the cable, the electrical resistance of the cable and the heat dissipating properties of the surroundings. The electrical current is a fixed requirement, specified by how much power the cable needs to deliver, and it is usually not an option to reduce this parameter. The ambient temperature and heat dissipating properties of the surroundings are often hard to affect, and the other specifications of the cable must therefore be adapted to these relatively inflexible factors to be able to deliver the required amount of electric current without exceeding its ampacity.

High voltage cable systems are often required to traverse stretches of water, resulting in relatively large variations in the heat dissipating properties of the cable's surroundings. These submarine cables are typically buried at shallow soil depths on the bottom of the seafloor, where water penetrates the soil surrounding the cable. The water provides the surroundings of the submarine cable with relatively favourable heat dissipating properties, dissipating heat far better than e.g. air and other types of soil. Parts of the submarine cable can also rest on the seafloor, or stretch through a body of water. In these cases, the environment of the submarine cable will have as good, if not better heat dissipating properties compared to being buried below the seafloor.

When the cable is brought ashore, it may either pass an underground region where the soil is not saturated with water, it may be brought along a surface of the ground, it may be provided elevated on a frame in the air or it may pass through a submarine region with inferior heat dissipating properties. Typically, if the cable passes an underground region, it may lie inside a horizontal directional drilling (HDD) pipe which has been provided in this region. In all these cases, the landfall region will usually have reduced heat dissipating properties, resulting in a so-called thermal bottleneck. To retain the same ampacity of the cable in the thermal bottleneck as in the submarine region, it is necessary to adapt certain specifications of the cable system.

Previous solutions to this bottleneck problem have been to provide a large increase of the cross sectional area of the conductor in the landfall region, giving a decrease in the electrical resistance of the conductor. However, due to the tendency of an alternating electric current (AC) to become distributed within a conductor such that the current density is largest near the surface of the conductor, the cross sectional area must be drastically increased if the ampacity is to be maintained without exceeding set thermal restrictions. Increasing the cross sectional area of the conductor has many negative effects: it requires substantially more material, such as copper, leading to an increase in production costs. Often the increase of the cross sectional area is so large that production is not practically possible. An increased cross sectional area of the conductor also leads to significantly higher sheath losses. Handling a submarine cable with a large cross sectional area also presents a multitude of problems due to added weight and size of the cable, requiring corresponding dimensioning of systems on board a cable-laying vessel.

WO2016/082860 discloses a cable with conductor sections with different cross-sectional layout that are thermally joined. The cable comprises a conductor at its centre, and may comprise a semiconductor layers around the conductor and one continuous outer sheath made of thermoplastic or thermosetting polymer enclosing the semiconductor layers. The cable may also comprise additional metallic sheaths. The prior art partially solves the problem of having a conductor with a large cross sectional area along the entire cable, as only the section of the cable located in the thermal bottleneck is fitted with a conductor with a larger cross sectional area. However, this still leaves a substantial section of the cable system with a conductor of an undesirably large cross sectional area.

OBJECT OF THE INVENTION

The present invention aims at providing a cable arrangement adapted to maintain ampacity in a section of a submarine cable system being exposed to a landfall region. The landfall region being an area which possesses relatively unfavourable heat dissipating compared to a submarine region.

The arrangement according to the invention reduces the need for a highly increased conductor cross sectional area in said section of the cable at a landfall region. Besides the economic and production related benefits, decreasing the cross sectional area of a submarine cable would make pull-in operations easier, and would give considerable savings related to handling equipment such as rollers, storage drums etc. The dimensions of the HDD pipe can also be reduced.

A further objective is to reduce the sheath losses from the cable system especially at the landfall region.

A further objective is to reduce the weight of the cable at the landfall region.

A more specific aim is to prevent the circulating currents in the sheaths of the cable at the landfall region.

Another aim of the invention is to avoid damage to the cable during transient events.

The technical problem is solved by the invention as set forth and characterized in the independent claims, while the dependent claims describe additional details and embodiments of the invention.

SUMMARY OF THE INVENTION

The cable arrangement according to the invention comprises a plurality of cores. Each core comprises a conductor, a first insulating layer, a second electrically conductive layer and a third layer.

The cable comprises two sections, connected at a connection point CP. A first section of the cable is arranged to be exposed to a landfall area and a second section of the cable is arranged to be exposed to a submarine area.

The cable is arranged such that circulating currents are prevented or reduced in the second conductive layers of the cable in the section exposed to the landfall area, thus assisting in maintaining the ampacity of the cable in this section without, or by reducing, the need to increase the cross sectional area of the cable in the landfall area. This is accomplished by electrically connecting the second conductive layers of the cores to each other at the connection point. At a distal end of the first section of the cable, the second layers are arranged to leave an open ended termination. This avoids a closed circuit that would otherwise create circulating currents in the second layers of the first section, thus maintaining ampacity.

According to a first embodiment, the conductive layers are electrically connected to each other at the connection point by a metal strip wrapped about the second layers of the cores. This may be accomplished, for example, by cutting a portion of the third layers at the connection point to expose the underlying second layers, about which the metallic strip is wrapped.

According to a second embodiment, the entire third layer in the second section of the cable (i.e. the submarine area) comprises a semiconducting material. In this embodiment, the second layers of the cores are each in direct contact with said third layer, and are thereby electrically connected to each other at the connection point through the third layer itself.

According to a third embodiment, the third layer in the second section of the cable (i.e. the submarine area) comprises alternating segments of semiconducting and non-conductive material, with a segment of semiconducting material laying adjacent to the connection point. In this embodiment, the second layers of the cores are again each in direct contact with said third layer, and are thereby electrically connected to each other at the connection point through the semiconducting segments of the third layer.

Electrically connecting the second layers of each core provides a cross-over flow of circulating currents between the second layers, thereby ensuring that the potential at the connection point is zero. At the connection point the second layers of the cable's first section will also be at zero potential, and since the second layers of the cable's first section are terminated in an open ended termination there will not be any circulating currents in the second layers of the cable's first section. With no circulating currents in the first section, which coincides with the area of unfavourable environmental conditions such as the landfall region, losses and heat generation in the second layer will be reduced. Thus, the cable will retain its ampacity without the need for a highly increased cross sectional area along the first section.

According to one aspect, the invention concerns a submarine cable landfall system, in which the following definitions shall apply:

The term sea is used herein to denote any body of water, such as lake, river, ocean etc.

The term seafloor is used to describe the bottom surface or floor of any body of water.

The term landfall position is used to describe a position where the cable passes an imaginary vertical line, the vertical line being located through the shoreline. The landfall position thus marks the separation between a seaside-portion and a land-side portion of the cable.

The term sea-side portion is used to describe the portion of the cable running from the landfall position and out under the sea.

The term land-side portion is used to describe the portion of the cable running from the landfall position and in to land.

The term connection point denotes a point where two sections of the cable are connected, in particular where the second layers of each core are electrically connected to each other, and thus marks the boundary between a first and second section of the cable. The connection point may for example be arranged at a distance of 0-4 kilometres from the landfall position, though this distance is determined by where the cable enters a landfall region from a submarine region, and where the relative difference in heat dissipating properties of the environment creates a so called thermal bottleneck. The connection point could therefore also be located at a distance of 50 meters to 1 kilometre from the landfall position, or from 1-2 kilometres, or from 2-3 kilometres, or from 3-4 kilometres, or from 1-3 kilometres.

The term submarine region denotes the region where the cable is arranged on the bottom of the seafloor, running through the body of water or buried in a distance beneath the seafloor, typically 1-5 metres. In the case where the system is buried 1-5 m beneath the seafloor, the soil is saturated with water. Thus, in all instances the cable is in contact with water when it passes through a submarine region, providing a beneficial heat dissipating environment. The submarine region typically lies beyond the connection point out to sea, coinciding with the cable's second section, that is from 0-4 kilometres from the shoreline and extending further out.

The term landfall region is used to describe the region where the cable experiences a thermal bottleneck, due to inferior heat dissipating properties of the environment compared to the submarine region. In the landfall region the cable typically has passed from an adjacent submarine region. The landfall region may comprise a region where the cable is buried around 5-15 m below either a seafloor or land surface. At a depth of 5-15 m the soil is usually not saturated with water, therefore the surroundings of the cable have less beneficial heat dissipating properties. The term landfall region may also include a region lying inside a horizontal directional drilling (HDD) pipe, where the cable will be separated from contact with water. The term landfall region may also be used to denote a region where the cable lies on a land surface, is elevated in the air or lies on the seabed e.g. where the cable approaches a shoreline. In parts of the landfall region the cable may be partly in contact with water. The defining characteristic of the landfall region is that it provides a less heat dissipating environment than the submarine region. The landfall region typically lies from the connection point and extends in to the land-side portion, coinciding with the cable's first section.

The term single-end bonding as used herein means a configuration in which one end of a cable's sheath is grounded, or kept at zero potential. The opposite end of the sheath is not grounded, this end therefore being called the open end. This configuration thereby prevents currents circulating in the sheath as there is no closed circuit, instead a standing voltage appears and increases linearly along the length of the sheath away from the grounded end.

The term open ended termination is used to denote the open end of a cable sheath in a single-end bonding configuration.

The term transient events is used to describe power surges in the cable system. These transient events can occur due to a number of different reasons, including external events such as lightning.

All references to a/an/the conductor, layer, etc. are to be interpreted as referring to at least one instance of the element unless explicitly stated otherwise.

These and other characteristics of the invention will be described in detail with reference to preferred embodiments of the invention, given as a non-restrictive examples, with reference to the attached drawings wherein the following reference signs are employed:

REFERENCE SIGNS LIST

| | |
|---|---|
| 1 | Cable |
| 1A | Cable's first section |
| 1B | Cable's second section |
| 2 | Core |
| 3 | Conductor |
| 4 | First electrically insulating layer |
| 5 | Second electrically conducting layer |
| 6 | Third layer |
| 6a | Third layer, insulating |
| 6b | Third layer, semiconducting |
| 6c | Third layer, additionally insulating |
| 7 | Reinforcing layer |
| 8 | Surge voltage limiter |
| 9 | Open ended termination |
| 10 | Distal end of cable's second section |
| 11a | Electrically insulating segment |
| 11b | Electrically semiconducting segment |
| 12 | Metal strip |
| 13 | Grounding electrode |

BRIEF DESCRIPTION OF DRAWINGS

The present invention is further explained with reference to the enclosed figures wherein.

It should be noted that for FIG. 3-8 only the parts of the cable that are especially relevant for the understanding of the particular embodiment are illustrated to simplify the figures.

DETAILED DESCRIPTION OF THE INVENTION

The inventive concept will now be described more fully hereinafter with reference to the accompanying drawings.

Figure 1:
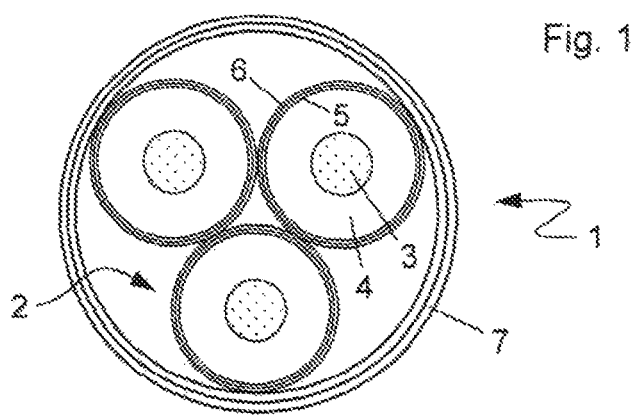
FIG. 1 schematically illustrates an example of a cross section of the cable.

FIG. 1 schematically illustrates an example of a cross section a cable 1, where the cable is shown with three cable cores 2. However, this invention is not limited to a three-core cable, and the cable may comprise two or any higher number of cores, as is deemed suitable for the cables necessary purposes.

Each core 2 comprises an electrical conductor 3 arranged in the centre of the core 2, the electrical conductor 3 has a cross sectional area, which affects the ampacity of the cable. As will be explained in further detail, the cable may have different sized cross sectional areas along the first and second sections. The conductor 3 may comprise copper or aluminium, or alloys of these as will be known to the person skilled in the art.

Arranged radially outside each conductor 3 is a first, electrically insulating layer 4. The electrically insulating layer 4 commonly comprises a cross-linked polyethylene (XLPE) material and is arranged to electrically insulate the conductor 3.

Outside the first electrically insulating layer 4, there is arranged a second, electrically conducting layer 5. The electrically conducting layer 5 commonly comprises a metallic sheath, arranged to electrically shield and protect the conductor from abrasion, corrosion and moisture. The metallic sheath may comprise lead, copper or other metals and alloys known to the person skilled in the art.

Outside of the second electrically conducting layer 5, there is arranged a third layer 6. The third layer 6 may either comprise an electrically insulating material or electrically semiconducting material. The electrically insulating material commonly comprises an insulating polyethylene arranged to insulate each of the second electrically conducting layers 5. The electrically semiconducting material typically comprises a semiconducting polyethylene arranged to electrically connect the each of the second layers 5 to each other and to any further outlying layers or material of the cable.

The plurality of cores 2 form a core bundle which is surrounded by at least one reinforcing layer 7. In the case that there is plurality of reinforcing layers 7, an outer reinforcing layer may comprise an armouring layer adapted for mechanical protection of the core bundle. The armouring layer may comprise metallic wires, braid, sheath or low loss armour. These variations in the armouring material and construction are familiar to the person skilled in the art. The armouring layer may extend across parts of the cable.

It should be noted that the cable 1, and variations thereof, may comprise additional layers and filling material arranged radially outside each conductor and the core bundle not described further herein. These layers and materials may be arranged inside, in-between or outside the already mentioned layers herein, and may comprise for example additional insulating, semiconducting, conducting, shielding and armouring layers as is well known in the art. In the case of that these layers comprise conducting or semiconducting material, they may be arranged to ground a third semiconducting layer 6 to the outside environment of the cable 1.

Figure 2:
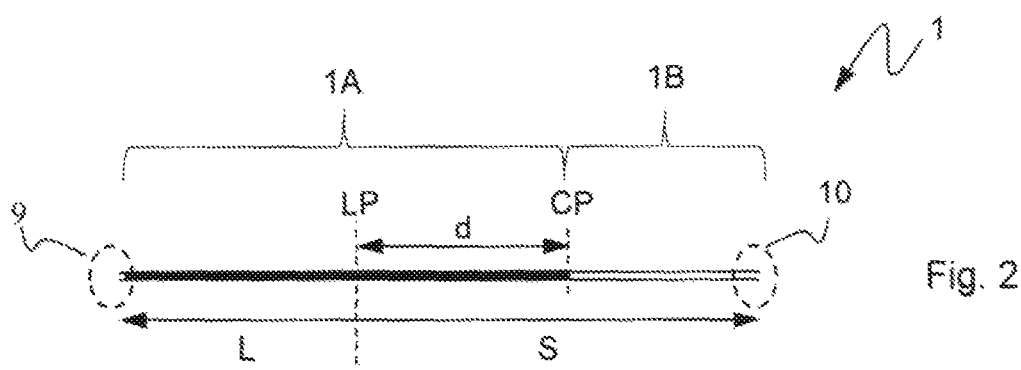
FIG. 2 schematically illustrates the cable system separated into sections traversing a landfall region.

As shown in FIG. 2, the cable arrangement according to the invention comprises a first cable section 1A and a second cable section 1B, the cable sections having a connection point CP dividing the sections.

The second cable section 1B is intended and thus arranged to be exposed to a submarine region. Due to the cable's second section 1B being in contact with water in the submarine region, this surrounding environment provides relatively favourable heat dissipating properties. The conductor's 3 cross sectional area in the second section 1B may therefore be minimised whilst retaining a relatively high ampacity.

The first cable section 1A is intended and thus arranged to be exposed to a landfall region. Due to relatively less favourable heat dissipating properties in the landfall region, the conductor's 3 cross sectional area in the first section 1A may therefore need to be slightly larger than the conductor's cross sectional area in the second area 1B for the cable to be able to retain its ampacity. However, it is important to note that due to the effect of the present invention as discussed below, any increase in conductor 3's cross sectional area in section 1B relative to the first section 1A, will be minimized compared to the prior art.

According to one aspect of the invention, the first cable section 1A and second cable section 1B may be joined at the connection point with a factory-performed splice. According to another aspect, the sections may be joined by a field-performed joint at the connection point CP.

To maintain the cable's ampacity while minimizing or eliminating any need to increase in the conductor's 3 cross sectional area in the first section 1A, the second electrically conducting layers 5 of the cores 2 of cable 1 are single end bonded in the first section 1A. Single-end bonding of the second layers 5 is achieved by effectively reducing the electric potential in the second layers 5 to zero at the connection point CP, and providing the second layers 5 with an open ended termination 9 at the distal end of the first section 1A of the cable as shown in FIG. 2, thus leaving an open circuit. The electric potential of the second layers 5 is effectively reduced to zero either by electrically connecting the second layers 5 of each core to each other at or immediately adjacent to the connection point CP and/or grounding the second layers 5 of each core at or immediately adjacent to the connection point CP as shown in FIGS. 3-8, which illustrate various embodiments of a three-core cable. The open ended termination 9 is achieved by preventing the second layers 5 at the first section's distal end to be grounded or form a closed circuit.

Figure 3:
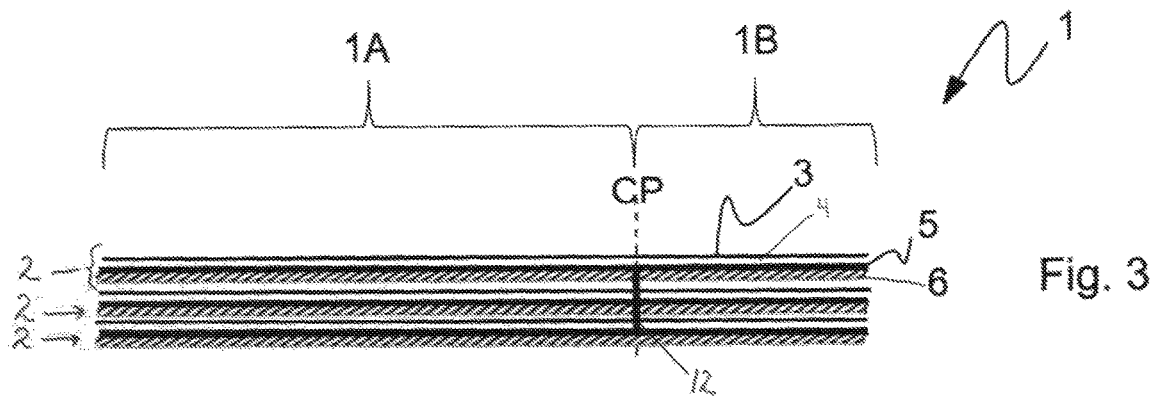
FIG. 3 schematically illustrates an embodiment of a three-core cable where single end bonding of three cable cores is accomplished by solidly bonding each of the second layers to each other with a metal strip.

In one embodiment, as shown in FIG. 3, the electric potential is effectively reduced to zero by solidly bonding the second layers 5 of each core 2 at the connection point CP to each other by a metal strip 12. A portion of the third layer 6 is removed at the connection point, thus exposing the underlying second layers 5 of the respective cores. Metal strip 12 is connected to, for example wrapped about, the second layers 5, thus electrically connecting said second layers 5 to each other. Metal strip 12 is preferably of the same material as the second layers 5.

Figure 4:
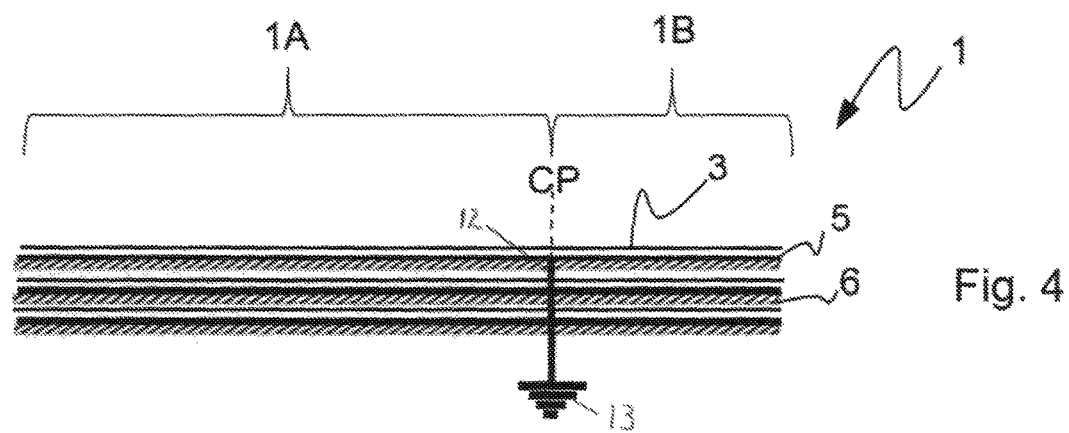
FIG. 4 schematically illustrates the embodiment from FIG. 3 with the second layers connected to a grounding electrode.

In an alternative embodiment, as shown in FIG. 4, the second layers 5 are solidly bonded as in the embodiment described above, but the metal strip 12 is also connected to a grounding electrode 13 at the connection point CP. The grounding electrode 13 is adapted to be in electrical contact with the environment outside the cable, thereby grounding the second layers 5.

Figure 5:
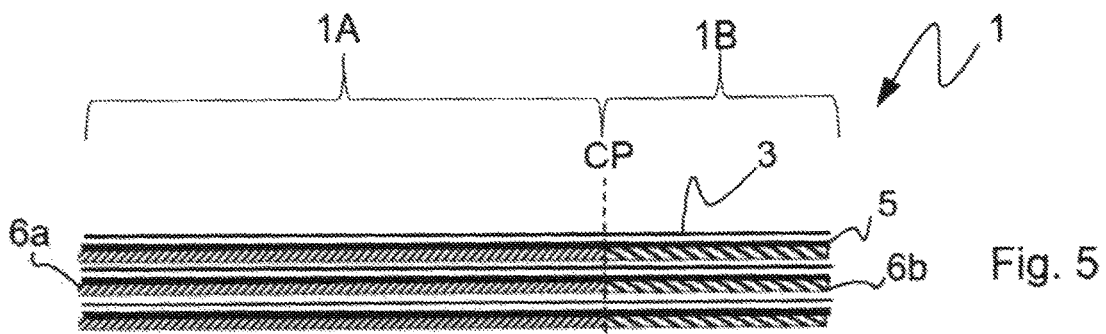
FIG. 5 schematically illustrates an embodiment of a three-core cable where single end bonding of the three cores is accomplished by virtue of the third layers along the second section of the cable comprising a semiconducting material.

In yet another alternative embodiment, as shown in FIG. 5, the third layer 6 comprises an electrically insulating material, denoted as layer 6a, along the cable's first section 1A and a semiconducting material, denoted as layer 6b, along the second section 1B. The semiconducting third layer 6b along the second section 1B is in electrical contact with the underlying second layer 5 of the second section 1B, and each of the third layers 6b being in contact with each other, as seen in FIG. 1.

Thereby, in this embodiment the second electrically conducting layers 5 are in electrical contact with each other along the second section 1B, via the semiconducting material of the third layers 6b. This ensures a cross over flow of electric currents from the second electrically conducting layers 5 across the third semiconducting layers 6b in the second section 1B, and thereby ensures that the electric potential will effectively be reduced to zero at or immediately adjacent to the connection point CP. The semiconducting layer 6b may also be in electrical contact with electrically conductive or semiconducting materials of the cable 1 arranged outside of the third layer 6b. These outside layers may again be in electrical contact with the cable's surrounding environment, thereby grounding the second electrically conducting layer 5 via the third electrically semiconducting layers 6b along the second section 1B, further ensuring that the electric potential is effectively reduced to zero at or immediately adjacent to the connection point CP.

Figure 6:
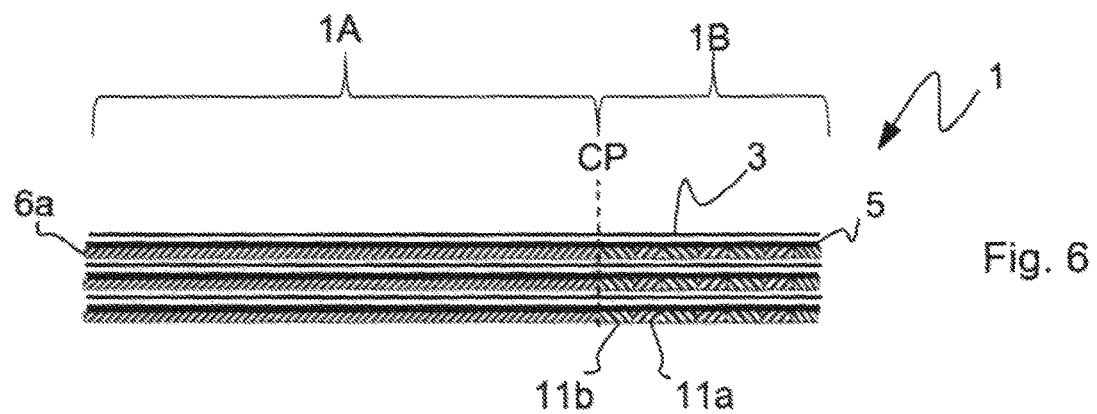
FIG. 6 schematically illustrates an embodiment of a three-core cable where single end bonding of the three cores is accomplished by virtue of the third layers along the second section of the cable comprising alternating segments of semiconducting material and electrically insulating material.

In yet a further embodiment, as shown in FIG. 6, the third layer 6 comprises an electrically insulating material, denoted as layer 6a, along the cable's first section 1A. The third layer 6 along the second section 1B comprises a plurality of alternating first and second segments 11a and 11b. Segments 11b comprise electrically semiconducting material and segments 11a comprise an insulating material. In this embodiment, the second electrically conducting layers 5 are in electrical contact with each other along the second section 1B via the electrically semiconducting segments 11b in a similar manner as described in connection with the embodiment from FIG. 5. As can be seen in FIG. 6, the segment lying immediately adjacent to the connection point CP is a semiconducting segment 11b, thereby ensuring that the electric potential will effectively be reduced to zero at the connection point CP. As with the embodiment shown in FIG. 5, the semiconducting material of segments 11b may be in electrical contact with the surroundings of the cable 1, thereby grounding the second layers 5 via these segments, further ensuring that the electric potential is effectively reduced to zero at or immediately adjacent to the connection point CP.

Solid bonding of the second layers 5, as shown in the embodiments in FIG. 3 and FIG. 4, may also be combined with the third layer 6 comprising semiconducting material, as shown in the embodiments of FIG. 5 and FIG. 6.

As seen in FIG. 2, at the distal end of the first section 1A from the connection point CP, the second layers 5 for each of the above described embodiments are terminated in an open ended termination 9, thus leaving an open circuit and ensuring single-end bonding. Single-end bonding of the second layers 5 in the first section 1A causes an increasing standing voltage arising along the length of the second layers 5 towards the distal end of the first section 1A, requiring sufficient insulation of the second layers 5 by the third layers 6 to prevent a closed circuit being formed at any point.

Figure 7:
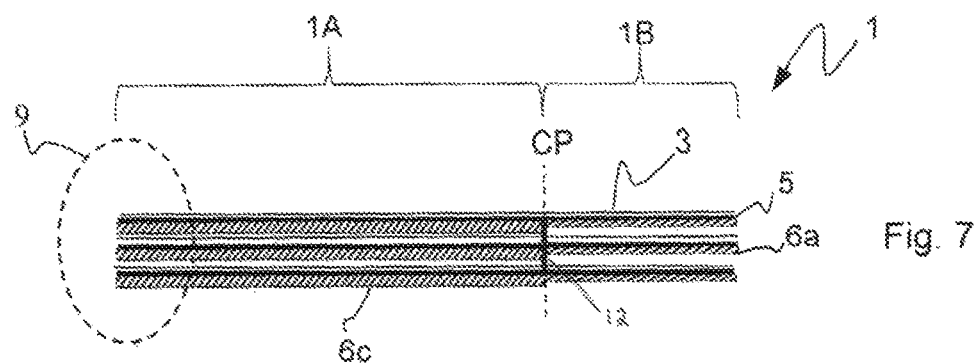
FIG. 7 schematically illustrates an embodiment of a three-core cable, where the third layers of the first section of the cable are additionally insulating.
Figure 8:
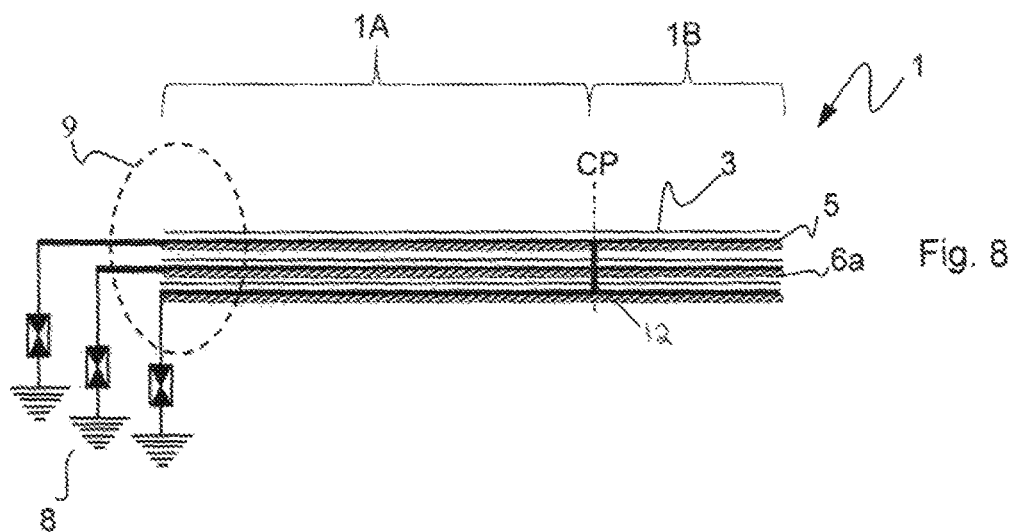
FIG. 8 schematically illustrates an embodiment of a three-core cable, where the second layers are connected to surge voltage limiters.

This standing voltage poses a danger, especially during transient events when the second layers 5 experience peak surges in voltage. These transient events can cause a difference in potential between each of the second layers 5 and the outside of their respective third layers 6 which can be large enough for an electric current to pass through the third layers 6. This can damage both the second layers 5 and third layers 6, leading to an ingress of moisture and ultimately a failure of the cable system. FIGS. 7 and 8 detail two embodiments of the cable's construction in the first section 1A arranged to maintain insulation of the second layers 5 and thereby an open ended termination 9.

In one embodiment, as shown in FIG. 7, the third layers 6 in the first section 1A are an additionally insulated portion 6c, additionally dimensioned to provide sufficient insulation to insulate the second layers 5 from peak voltage surges during transient events. The dimensioning of the portions 6c along the first section 1A is not explained in further detail herein, as it will be known to the person skilled in the art and subject to factors such as mechanical and process engineering considerations, and regulated by standards such as IEC 60287, IEC 62067, IEC 60840 and Cigre TB 283.

In another embodiment, as shown in FIG. 8, the second layers 5 in the first section 1A are connected to a surge voltage limiter 8, also known as sheath voltage limiter, surge arrester, surge protection device or transient voltage arrester. The surge voltage limiter 8 protects the second layer 5 from induced voltage during transient events: the limiter is passive and isolates the sheath from the ground during normal operational voltage, whilst routing the energy to the ground during surges in voltage. Thereby the voltage limiters 8 act as a safety valve, sending excessive voltage straight to the ground instead of risking that a current passes through the third layer 6, potentially puncturing it.

According to one aspect, the open ended termination 9 at the distal end of the cable's first section may comprise a high voltage shield break joint, which allows the second layers 5 to have an open ended termination while being further connected to other devices.

Returning to FIG. 2, the cable system is shown schematically traversing a landfall position LP, which separates a sea-side portion S of the cable 1 from a land-side portion L of the cable 1. The connection point CP lies in the sea-side portion S of the cable 1.

The distal end 9 of the cable's first section 1A may be terminated at any point along the land-side portion L, extending from and including the landfall position LP. The distal end of the cable's first section 1A may be terminated by being directly coupled with said shield break joint to a cable landing station, a cable termination station, a cable connection unit or a land cable.

The distal end 10 of the cable's second section 1B may, as an example, originate in a submarine cable landfall system, especially if the cable is arranged under a body of water between two shores. The submarine cable landfall system at the distal end 10 of the second section 1B may be a conventional landfall system, or it may be similar to the one described herein. However, several other different variations are possible, where the distal end 10 the cable's second section 1B may originate from a subsea unit, a ground-fast platform, a floating unit etc.

As shown in FIG. 1, the cable may have an outer reinforcing layer 7 comprising an armouring layer for mechanical protection of the cable which may comprise a low loss armour to minimise sheath losses and heat generation. The armouring layer will typically only be necessary on the sea-side portion S of the cable. In the case that the cable lies inside a HDD pipe in the landfall region, the cable will not need an armouring layer where it lies inside the pipe in which case the armouring layer will be present on the cable's second section 1B.

By single-end bonding the second layers 5 in the first section 1A, there are no circulating currents in this section 1A and thus there is less heat generation. Since the first section 1A is exposed to a landfall region, the conductors 3 can retain a relatively high ampacity without needing a large increase in cross sectional area in this section 1A.

Below is presented a non-limiting example of the savings provided by the present invention in an illustrative example of a cable landfall system with an active power of P=350 MW and system voltage U=220 kV:

The surrounding temperature is 15 ° Celsius, with the cable buried 1.5 meters deep in a seabed and buried 15 meters deep in a landfall region by Horizontal Directional Drilling.

A typical three core submarine cable may have conductors 3 with a cross sectional area of 3×1200 mm$^2$ Cu in the submarine region. With a conventional cable landfall system the conductors will require a cross sectional area of 3×1800 mm$^2$ Cu in the landfall region to retain the cable's ampacity.

With the new and inventive cable system described herein, the cross sectional areas of the conductors 3 could stay at 3×1200 mm$^2$ Cu in the cable's first section 1A, whilst the retaining the cable's ampacity, thus requiring no increase in cross sectional area relative to the conductors 3 in the second section 1B.

This example is given as a purely illustrative example of the savings this invention may produce, none of the parameters given in the example are to be taken as limiting. The parameters of a cable system and the environment surrounding it will of course vary from case to case, and the resulting cross sectional areas of the conductors 3 and the corresponding maximum ampacity will have to be determined for each case.

The invention is herein described in non-limiting embodiments and variations. A person skilled in the art will understand that there may be made alterations and modifications to the embodiments and variations that are within the scope of the invention as described in the attached claims.

The invention claimed is:

1. A submarine low loss cable system, comprising a high voltage alternating current cable comprising a plurality of cable cores, each core comprising:
   a central, electrical conductor,
   a first, electrically insulating layer arranged radially outside of the electrical conductor,
   a second, electrically conducting layer arranged radially outside of the first layer, and
   a third layer arranged radially outside of the second layer, wherein:
   a first section of cable is connected to a second section of cable at a connection point, said second section being adapted to being exposed to a submarine area,
   at which connection point the second layers of each core are electrically connected to each other, and wherein at a distal end of first section of cable, the second layers are terminated as an open ended termination.

2. The cable system according to claim 1, wherein the second layers of each core are electrically connected to each other at the connection point by a metal strip.

3. The cable system according to claim 2, wherein the metal strip is connected to a grounding electrode.

4. The cable system according to claim 1, wherein in said second section, the third layer of each core is a semiconducting layer being in electrical contact with its underlying second layer, and wherein the third electrically semiconducting layers of each core are in electrical contact with each other, thereby electrically connecting the second layers of each core through the electrically semiconducting layers.

5. The cable system according to claim 4, wherein in said second section, the third electrically semiconducting layer of each core is adapted to be in electrical contact with the surroundings of the cable, thereby grounding the second layers via the semiconducting layers.

6. The cable system according to claim 1, wherein in said second section, the third layer of each core comprises alternating first and second segments, wherein first segment is made of an electrically insulating material and wherein second segment is made of an electrically semiconducting material, which semiconducting segments are in electrical contact with the underlying second layer, thereby electrically connecting the second layers through the third layer's electrically semiconducting segments.

7. The cable system according to claim 6, wherein an electrically semiconducting segment is immediately adjacent to the connection point.

8. The cable system according to claim 7, wherein said electrically semiconducting segments are adapted to be in electrical contact with the surroundings of the cable, thereby grounding the second layers via the semiconducting segments.

9. The cable system according claim 1, wherein a surge voltage limiter is connected to the second layer of each core at distal end.

10. The cable system according to claim 1, wherein in said first section, the electrical conductor of each core has a first cross sectional area, and in said second section, the electrical conductor of each core has a second cross sectional area, the first cross sectional area being larger than the second cross sectional area.

11. The cable system according to claim 1, wherein the first and second sections of the cable are jointed with a factory performed splice or joint at the connection point.

12. The cable system according to claim 1, wherein the first and second sections of the cable are adapted to be jointed with a field performed splice or joint at the connection point.

13. The cable system according to claim 1, wherein said open ended termination at distal end of the cable's first section is adapted to be coupled to any one of the following: a land cable, a cable connection unit, a cable landing station and a cable termination station.

14. The cable system according to claim 1, wherein a distal end of the second section is adapted to be coupled to any one of the following: a submarine cable landfall system, a subsea unit, a ground-fast platform and a floating unit.

15. The cable system according to claim 1, wherein said system is arranged as a cable landfall system, whereby said high voltage alternating current cable:
traverses a cable landfall position separating a sea-side portion of the cable from a land-side portion of the cable,
said connection point is located on the sea-side portion of the cable, at a predetermined distance from the landfall position,
said first section extends from the connection point and further into the land-side portion of the cable,
said second section extends from the connection point and further out into the sea-side portion of the cable.

16. The cable system according to claim 15, wherein said predetermined distance between the connection point and the landfall position is within the range of 0 to 4 kilometres.

17. The cable system according to claim 15, wherein the first section of the cable traverses a landfall region.

18. A method of arranging a cable landfall system, comprising:
providing a low loss cable system according to claim 1,
arranging the cable system to traverse a cable landfall position separating a sea-side portion of the cable from a land-side portion of the cable,
locating the connection point on the sea-side portion of the cable, at a predetermined distance from the landfall position, such that:
said first section extends from the connection point and further into the land-side portion of the cable,
said second section extends from the connection point and further out into the sea-side portion of the cable.

19. The method according to claim 18, wherein said predetermined distance between the connection point and the landfall position is within the range of 0 to 4 kilometres.

20. The method according to claim 18, wherein the first section of the cable traverses a landfall region.

* * * * *